United States Patent
Okita

(10) Patent No.: US 9,064,100 B2
(45) Date of Patent: Jun. 23, 2015

(54) APPARATUS, SYSTEM, AND METHOD OF MANAGING OBJECT TO BE ACCESSED, AND RECORDING MEDIUM STORING PROGRAM FOR MANAGING OBJECT TO BE ACCESSED

(75) Inventor: Kunio Okita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 594 days.

(21) Appl. No.: 13/298,896

(22) Filed: Nov. 17, 2011

(65) Prior Publication Data

US 2012/0137354 A1    May 31, 2012

(30) Foreign Application Priority Data

Nov. 30, 2010  (JP) ................................. 2010-267748
Aug. 9, 2011    (JP) ................................. 2011-173755

(51) Int. Cl.
*G06F 7/04*     (2006.01)
*G06F 21/31*    (2013.01)

(52) U.S. Cl.
CPC ...................................... *G06F 21/31* (2013.01)

(58) Field of Classification Search
CPC ........... H04N 7/15; H04N 7/141; H04M 3/56; H04L 65/403; H04W 28/24; H04W 4/24
USPC ...................... 726/1, 10; 348/14.08, E7.083; 379/202.01; 709/204, 226; 370/260; 705/5, 44; 715/753, 716
See application file for complete search history.

(56) References Cited

U.S. PATENT DOCUMENTS

| | | | | |
|---|---|---|---|---|
| 5,555,375 A  * | 9/1996 | Sudama et al. | ............... | 709/226 |
| 8,046,435 B1 * | 10/2011 | Parekh et al. | ................. | 709/219 |
| 2007/0008937 A1 | 1/2007 | Mody et al. | | |
| 2008/0086422 A1 * | 4/2008 | Wolff et al. | ..................... | 705/50 |
| 2010/0057703 A1 * | 3/2010 | Brandt et al. | .................... | 707/4 |
| 2012/0195412 A1 * | 8/2012 | Smith | ........................ | 379/88.13 |

FOREIGN PATENT DOCUMENTS

| | | |
|---|---|---|
| JP | 2000-174934 | 6/2000 |
| JP | 2005-39790 | 2/2005 |
| JP | 2006-529062 | 12/2006 |
| JP | 2007-14011 | 1/2007 |
| JP | 2008-140404 | 6/2008 |
| JP | 2009-217722 | 9/2009 |

OTHER PUBLICATIONS

JP2008227577 (Machine Translation of JP2008227577, Dated: 2008).*

* cited by examiner

*Primary Examiner* — Brian Shaw
(74) *Attorney, Agent, or Firm* — Oblon, McClelland, Maier & Neustadt, L.L.P.

(57) ABSTRACT

An access object management system manages an object in a transmission system, which is allowed for access by a terminal in the transmission system, based on whether access by the terminal is restricted. The access object management system allows the terminal to access a part of the transmission system even when access by the terminal is restricted.

20 Claims, 9 Drawing Sheets

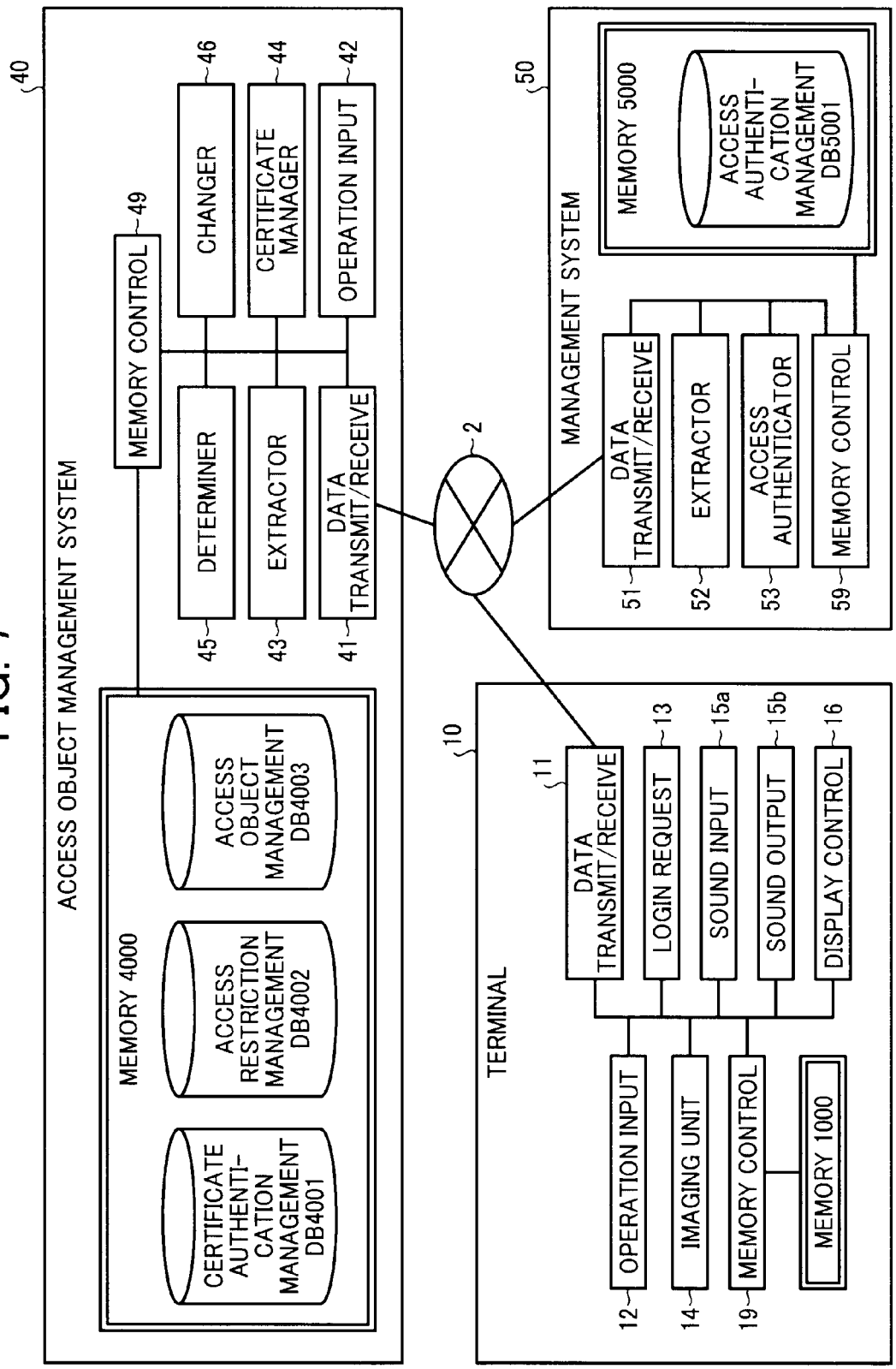

FIG. 8

CERTIFICATION MANAGEMENT TABLE

| TERMINAL CERTIFICATE | ACCESS DETERMINATION ID |
|---|---|
| 11aa | 00aa |
| 11ab | 00ab |
| ... | ... |

FIG. 9

ACCESS RESTRICTION MANAGEMENT TABLE

| ACCESS DETERMINATION ID | ACCESS RESTRICTION DATA | ACCESS AUTHENTICATION ID | ACCESS AUTHENTICATION PASSWORD |
|---|---|---|---|
| 00aa | NOT RESTRICTED | udc001 | udcpass001 |
| 00ab | RESTRICTED | udc002 | udcpass002 |
| ... | ... | ... | ... |

FIG. 10

ACCESS OBJECT MANAGEMENT TABLE

| ACCESS RESTRICTION DATA | ACCESS OBJECT URI |
|---|---|
| NOT RESTRICTED | MANAGEMENT SYSTEM URI, UPDATING SYSTEM URI, SCREEN PROVIDER SYSTEM URI |
| RESTRICTED | UPDATING SYSTEM URI, SCREEN PROVIDER SYSTEM URI |

FIG. 11

ACCESS AUTHENTICATION MANAGEMENT TABLE

| ACCESS AUTHENTICATION ID | ACCESS AUTHENTICATION PASSWORD |
|---|---|
| udc001 | udcpass001 |

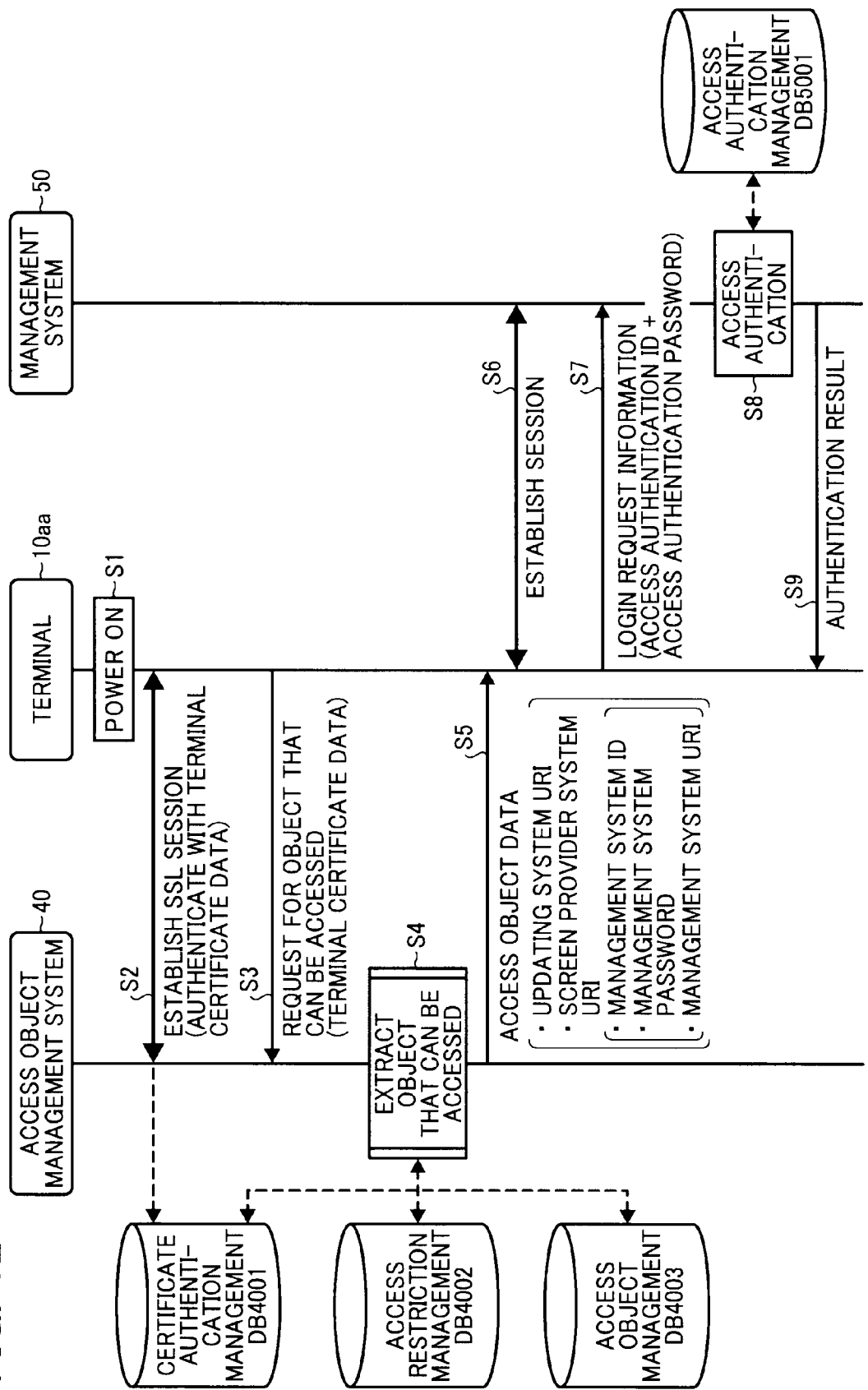

APPARATUS, SYSTEM, AND METHOD OF MANAGING OBJECT TO BE ACCESSED, AND RECORDING MEDIUM STORING PROGRAM FOR MANAGING OBJECT TO BE ACCESSED

CROSS-REFERENCE TO RELATED APPLICATIONS

This patent application is based on and claims priority pursuant to 35 U.S.C. §119 to Japanese Patent Application Nos. 2010-267748, filed on Nov. 30, 2010 and 2011-173755 filed on Aug. 9, 2011, in the Japan Patent Office, the entire disclosure of which is hereby incorporated herein by reference.

FIELD OF THE INVENTION

The present invention relates to managing an object that is allowed for access by a terminal.

BACKGROUND

As one example of transmission systems that transmit or receive contents data among a plurality of transmission terminals, videoconference systems are known, which carry out teleconference or videoconference among remotely located offices via a communication network such as the Internet. With the need for reducing costs or times associated with business trips, more companies are moving towards such videoconference systems. The videoconference systems allow transmission of contents data such as image data and/or voice data among a plurality of videoconference terminals that are remotely located from one another through the communication network to facilitate communication among the plurality of videoconference terminals.

Some videoconference systems allow a user to use videoconference services only when the user pays a usage fee to a service provider who provides the videoconference services. In addition to the videoconference services, the service provider may provide the user with various other services such as weather forecast information, regional news distribution, educational services, etc. In case the usage fee is not paid by the user, the service provider may prohibit the user from connecting to the communication network through the user's terminal until the usage fee is paid, for example, as described in Japanese Patent Application Patent No. 3446202 (Japanese Patent Application Publication No. 200017493).

SUMMARY

While disconnecting the terminal from the network may encourage the user to pay the usage fee, it may be inconvenient to some users as the user is not able to connect the terminal to the network even when the user wants to have services that should be provided free. For instance, if the service provider is supposed to provide the user with software for updating screens or functions of the terminal at no cost in spite of whether or not the usage fee is paid, the service provider should allow the user to connect to the network through the user's terminal for that purpose of updating while still prohibiting the unpaid user from using other services.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is a schematic block diagram illustrating functional structures of the transmission terminal, access object management system, and transmission management system of the transmission system of FIG. 1;

FIG. 8 is an example data structure of a certificate management table, managed by the access object management system of FIG. 7;

FIG. 9 is an example data structure of an access restriction management table, managed by the access object management system of FIG. 7;

FIG. 10 is an example data structure of an access object management table, managed by the access object management system of FIG. 7;

FIG. 11 is an example data structure of an access authentication management table, managed by the transmission management system of FIG. 7;

FIG. 12 is a data sequence diagram illustrating operation of accessing an object that is allowed for access by the transmission terminal of FIG. 1, performed by the transmission system of FIG. 1, according to an example embodiment of the present invention.

Figure 1:
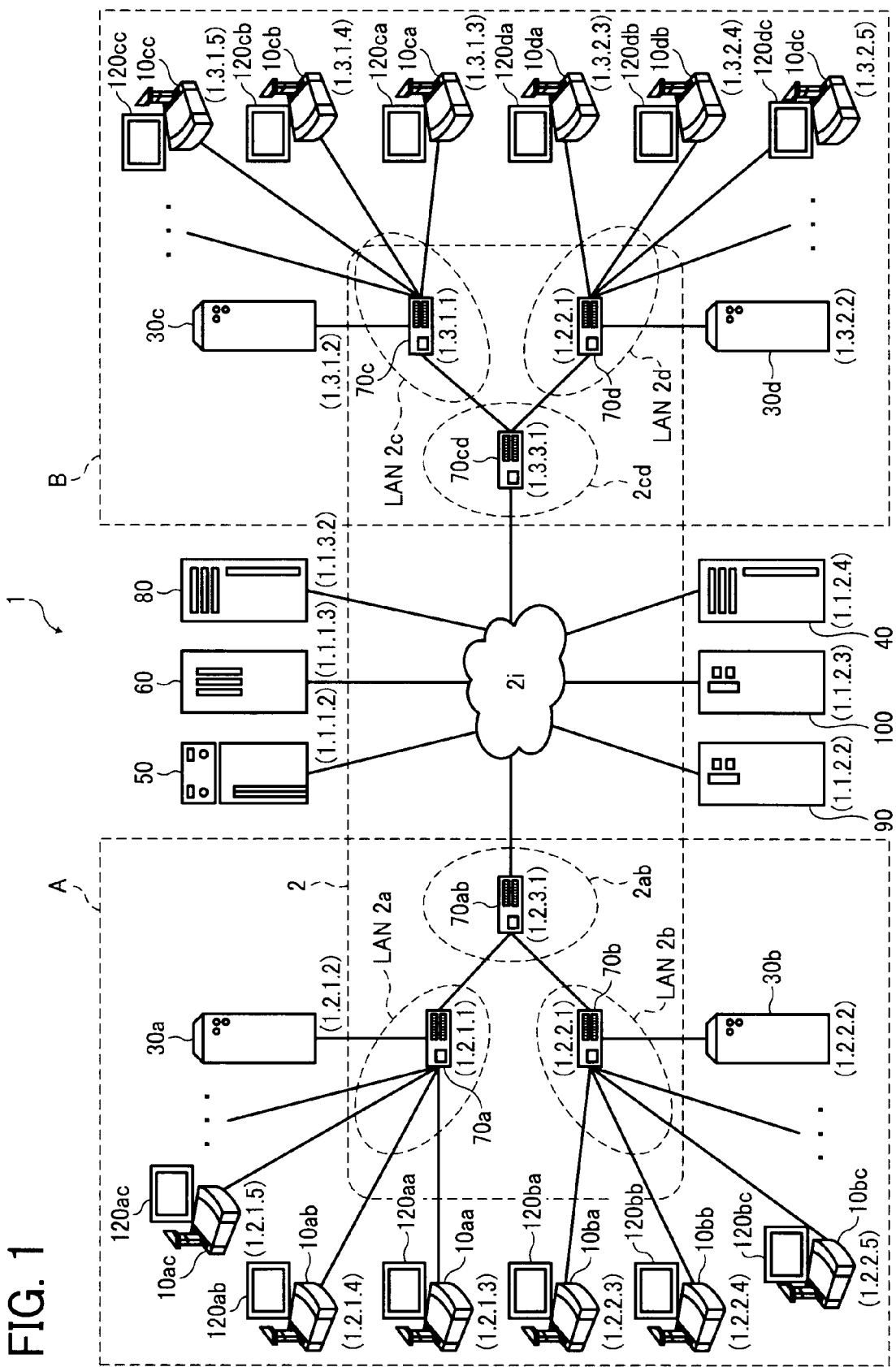
FIG. 1 is a schematic block diagram illustrating a configuration of a transmission system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIGS. 1 to 13, example embodiments of the present invention are explained.

<Structure of Transmission System>

Figure 2:
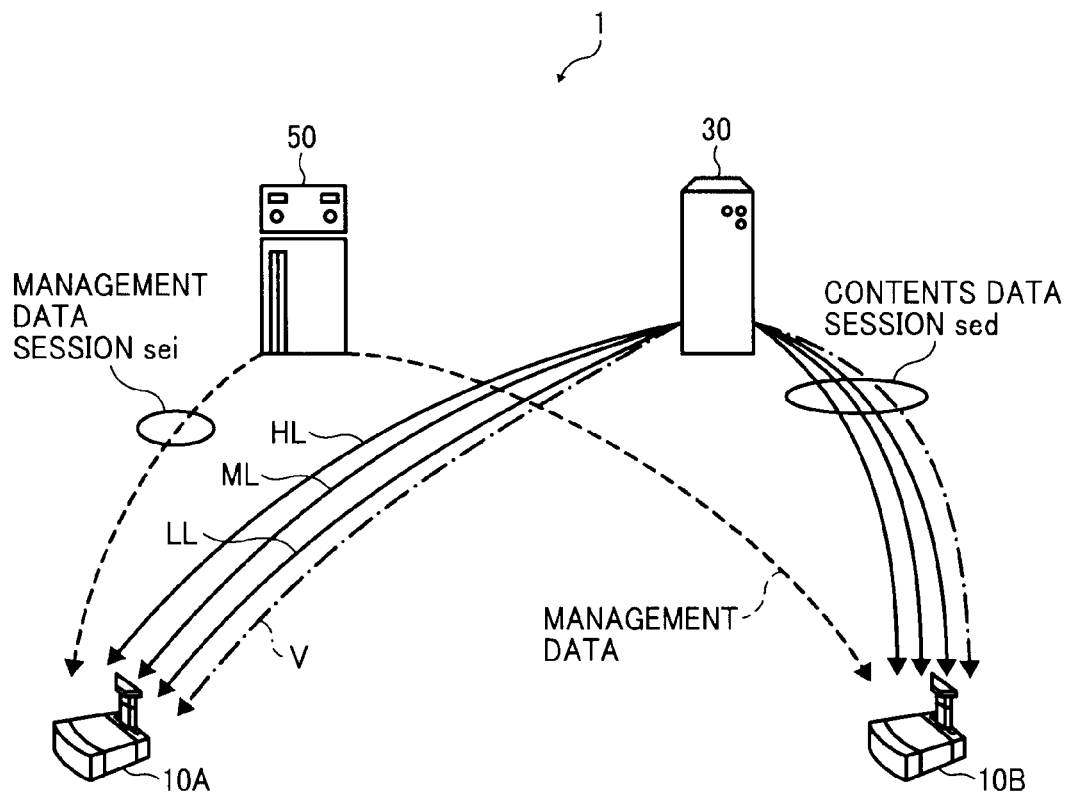
FIG. 2 is an illustration for explaining transmission or reception of data such as image data, voice data, or management data, performed by the transmission system of FIG. 1.
Figure 3A:
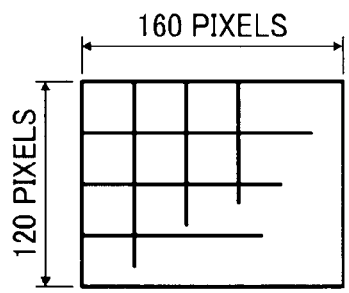
FIGS. 3A to 3C are illustrations for explaining image quality of image data transmitted or received by the transmission system of FIG. 1.
Figure 3B:
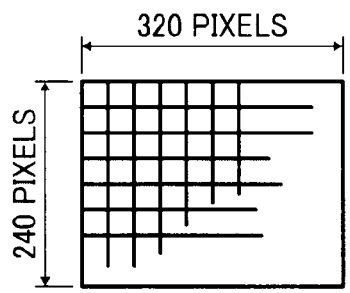
Figure 3C:
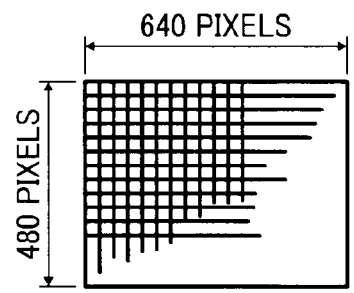

FIG. 1 is a schematic block diagram illustrating a configuration of a transmission system according to an example embodiment of the present invention. FIG. 2 is an illustration for explaining transmission or reception of data such as image data, voice data, or management data, performed by the transmission system of FIG. 1. FIGS. 3A to 3C are illustrations for explaining image quality of image data transmitted or received by the transmission system of FIG. 1.

In one example, the transmission system 1 functions as a data providing system that transmits contents data from one transmission terminal to another transmission terminal in one direction through a transmission management system 50. In another example, the transmission system 1 functions as a two-way communication system that exchanges various information including image data and/or voice data that is used to convey human's feelings between or among two or more of a plurality of transmission terminals 10 each of which functioning as a communication terminal, through the transmission management system 50 that functions as a communication management system. When functioning as the communication system, the transmission system 1 may be implemented as a videoconference system, video teleconference system, voice conference system, voice teleconference system, or personal computer screen sharing system.

In the following examples, it is assumed that the transmission system 1 of FIG. 1 is implemented as the videoconference system, which is one example structure of the communication system. Based on this assumption, the transmission management system 50 is implemented as the videoconference communication management system, which is one example structure of the communication management system. Further, the transmission terminal 10 is implemented as the videoconference communication terminal, which is one example structure of the communication terminal. However, the use of transmission system 1 is not limited to the following examples such that the transmission system 1 may be implemented as the transmission system or the communication system as described above.

The transmission system 1 of FIG. 1 includes a plurality of transmission terminal 10aa, 10ab, 10ac, 10ba, 10bb, 10bc, 10ca, 10cb, 10cc, 10da, 10db, and 10dc, and a plurality of displays 120aa, 120ab, 120ac, 120ba, 120bb, 120bc, 120ca, 120cb, 120cc, 120da, 120db, and 120dc, a plurality of relay terminals 30a, 30b, 30c, and 30d, an access object management system 40, a transmission management system 50, an updating system 60, a screen provider system 80, a program providing system 90, and a maintenance system 100.

The transmission terminal 10 transmits or receives contents data such as image data and/or voice data to or from another transmission terminal 10.

For the descriptive purposes, in this example, any number of the plurality of terminals 10aa to 10db may be collectively or each referred to as the terminal 10. Any number of the plurality of displays 120aa to 120db may be collectively or each referred to as the display 120. Any number of the plurality of relay terminals 30a, 30b, 30c, and 30d may be collectively or each referred to as the relay terminal 30. The transmission management system 50 may be referred to as the "management system" 50. The terminal 10 that transmits data to another terminal 10 to carry out videoconference is referred to as the request terminal 10A. The terminal 10 that receives data from another terminal 10 to carry out videoconference is referred to as the counterpart terminal 10B. For example, the request terminal 10A includes any terminal 10 that requests another terminal 10 to start videoconference, and the counterpart terminal 10B includes any terminal 10 that is requested by the request terminal 10A to start videoconference.

As illustrated in FIG. 2, in the transmission system 1, the request terminal 10A and the counterpart terminal 10B first establish a management data session sei to start transmission and reception of various types of management data through the management system 50. Further, in this example, the request terminal 10A and the counterpart terminal 10B establish four contents data sessions "sed" to transmit or receive contents data through the relay terminal 30. The four contents data sessions include a session "HL" to transmit high-level resolution image data HL, a session "ML" to transmit medium-level resolution image data ML, a session "LL" to transmit low-level resolution image data LL, and a session "V" to transmit voice data V. In this example, these four contents data sessions may be referred to as image and/or voice data sessions.

Referring now to FIGS. 3A to 3C, various image data having different resolution levels, which are respectively transmitted by the terminal 10 of the transmission system 1, are explained. Referring to FIG. 3A, the low-level resolution image data, which functions as a base image, has 160 pixels in the horizontal direction and 120 pixels in the vertical direction. Referring to FIG. 3B, the medium-level resolution image data has 320 pixels in the horizontal direction and 240 pixels in the vertical direction. Referring to FIG. 3C, the high-level resolution image data has 640 pixels in the horizontal direction and 480 pixels in the vertical direction. In case of communicating with a narrowband signal line, low-quality image data that is generated based on the low-level resolution image data, which is the base image, is transmitted. In case of communicating with a wideband signal line, medium-quality image data that is generated based on the low-level resolution image data and the medium-level resolution image data is transmitted. In case of communicating with a broadband signal line, high-quality image data that is generated based on the low-level resolution image data, the medium-level resolution image data, and the high-level resolution image data is transmitted. Any one of the above-described types of image data may be transmitted together with voice data.

Referring back to FIG. 1, the relay terminal 30, which may be implemented by a computer, relays contents data such as image data or voice data between or among the terminals 10. The access object management system 40, which may be implemented by a computer, manages an object that is allowed for access by the terminal 10. In this example, the object that is allowed for access by the terminal 10 is selected from the management system 50, the updating system 60, and the screen provider system 80, but the object is not limited to this example. The management system 50 centrally manages various information such as login information of the terminal 10, the operation state of the terminal 10, candidate list information, and the operation state of the relay terminal 10. In this example, it is assumed that a moving image is transmitted as the image data. Alternatively, a still image, or both of the still image and the moving image, may be transmitted as the image data.

The updating system 60 provides the terminal 10 with an update controlling program, which updates various programs stored in the terminal 10.

The plurality of routers 70a to 70d, 70ab, and 70cd, which may be collectively or each referred to as the router 70, selects a route that is most suitable for transmitting contents data such as image data and voice data.

The screen provider system 80 provides the terminal 10 with image data in a format such that it can be displayed through the terminal 10, for example, on a display of the terminal 10.

The program providing system 90 includes a hard disk device (HD) 204 (FIG. 6), which stores control programs that cause any one of the terminal 10, the relay terminal 30, the access object management system 40, the management system 50, the updating system 60, and the screen provider system 80, to respectively perform various functions or operations. For example, the program providing system 90 sends the control program to any one of the terminal 10, the relay terminal 30, the access object management system 40, the management system 50, the updating system 60, and the screen provider system 80, through the communication network 2 for installation of the control program.

The maintenance system 100 is implemented as a computer capable of maintaining, managing, fixing, or upgrading at least one of the terminal 10, relay terminal 30, access object management system 40, management system 50, updating system 60, screen provider system 80, and program providing system 90. Assuming that the maintenance system 100 is provided within a country, and the terminal 10, relay terminal 30, access object management system 40, management system 50, updating system 60, screen provider system 80, and program providing system 90 are each provided outside the country, the maintenance system 100 maintains, manages, fixes, or upgrades at least one of the terminal 10, relay terminal 30, access object management system 40, management system 50, updating system 60, screen provider system 80, and program providing system 90, remotely through the communication network 2. The maintenance system 100 may manage maintenance of at least one of the terminal 10, relay terminal 30, access object management system 40, management system 50, updating system 60, screen providing system 80, and program providing system 90 without using the communication network 2. For example, a machine type number, a manufacturing number, customer information, maintenance and repair information, and failure log information may be maintained at the maintenance system 100 without using the communication network 2.

Still referring to FIG. 1, the terminals 10aa, 10ab, and 10ac, the relay terminal 30a, and the router 70a are connected to a local area network (LAN) 2a. The terminals 10ba, 10bb, and 10bc, the relay terminal 30b, and the router 70b are connected to a LAN 2b. The LAN 2a and the LAN 2b are connected to a leased line 2ab in which the router 70ab is provided. It is assumed that these devices including the terminals 10aa to 10bc are located in an area A. For example, assuming that the area is any area in Japan, the LAN 2a could be located within an office in a city such as Tokyo, and the LAN 2b could be located within an office in another city such as Osaka.

The terminals 10ca, 10cb, and 10cc, the relay terminal 30c, and the router 70c are connected to a LAN 2c. The terminals 10da, 10db, and 10dc, the relay terminal 30d, and the router 70d are connected to a LAN 2d. The LAN 2c and the LAN 2d are connected to a leased line 2cd in which the router 70cd is provided. It is assumed that these devices including the terminals 10ca to 10dc are located in an area B apart from the area A. For example, assuming that the area is any area in the United States, the LAN 2c could be located within an office in a city such as New York, and the LAN 2d could be located within an office in another city such as Washington, D.C. The area A and the area B are connected through the Internet 2i, via the routers 70ab and 70cd.

The access object management system 40, management system 50, updating system 60, screen provider system 80, program providing system 90, and maintenance system 100 are connected through the Internet 2i to the terminal 10. The management system 50 is connected through the Internet 2i to the relay terminal 30. Any one of the access object management system 40, management system 50, updating system 60, screen provider system 80, program providing system 90, and maintenance system 100 may be located at any location within or outside any one of the area A and the area B.

In this example, the communication network 2 includes the LAN 2a, LAN 2b, leased line 2ab, Internet 2i, leased line 2cd, LAN 2c, and LAN 2d. Any one or any portion of these lines or any other lines that may be included in the communication network 2 may be implemented as wired network or wireless network such as Wireless Fidelity (WiFi) network or Bluetooth network.

As shown in FIG. 1, the terminal 10, the relay terminal 30, the access object management system 40, the management system 50, the updating system 60, the router 70, the screen provider system 80, the program provider system 90, and maintenance system 100 are each provided with four digit numbers. These four digit numbers separated by dots are the simple expressions of IP addresses respectively assigned to any one of the devices shown in FIG. 1, each of which has a function of communication device. For example, the IP address of the terminal 10aa is "1.2.1.3". For simplicity, it is assumed that the IP address is expressed in IPv4. Alternatively, the IP address may be expressed in IPv6.

Further, in this example, the terminal 10 may be communicated in various ways. For example, at least two different terminals 10 that are located at different rooms in the same office, or at least two different terminals 10 that are located at different offices that are remotely located from one another, may communicate with one another. In another example, at least two different terminals 10 that are located in the same room may communicate with one another. In another example, one terminal 10 that is located indoor and another terminal 10 that is located outdoor, or at least two different terminals 10 that are both located outdoor, may communicate with one another. When the terminal 10 is located outdoor, the terminal 10 communicates with the other terminal 10 through a wireless network such as a wireless network designed for a mobile phone.

<Hardware Structure of Transmission System>

Figure 4:
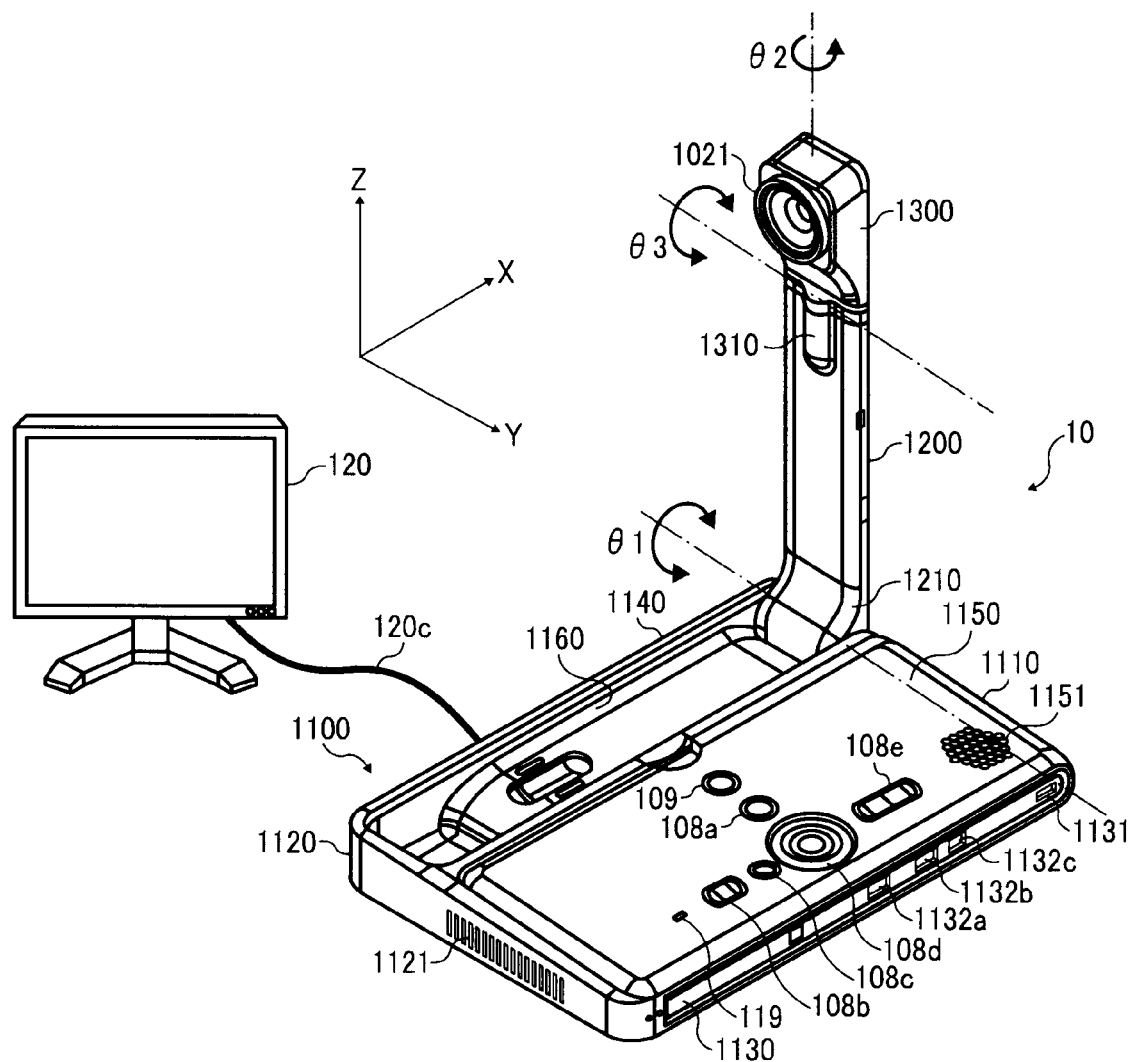
FIG. 4 is a perspective view illustrating the outer appearance of a transmission terminal of the transmission system of FIG. 1.

Next, a hardware structure of the transmission system 1 is explained according to an example embodiment of the present invention. FIG. 4 is a perspective view illustrating the outer appearance of the transmission terminal 10 of the transmission system 1 of FIG. 1. As illustrated in FIG. 4, the terminal 10 includes a body 1100, an arm 1200, and a camera housing 1300. The body 1100 includes a back side wall 1110 having a plurality of air intake holes that are formed over the nearly entire surface of the intake surface of the back side wall 1100. The body 1100 further includes a front side wall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, the internal microphone 114 of the terminal 10 is able to catch sounds such as human voice or any sound including noise.

Figure 5:
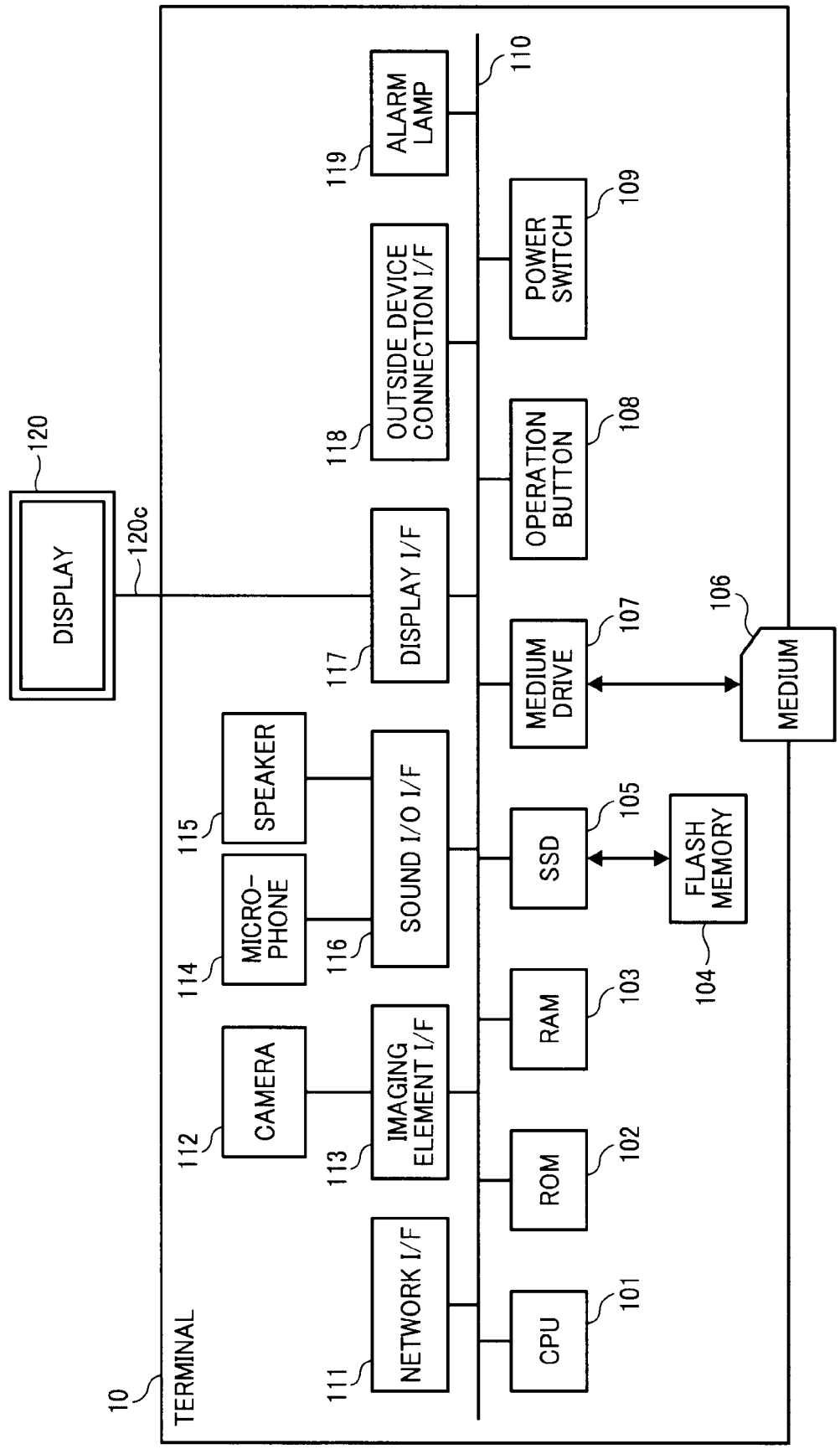
FIG. 5 is a schematic block diagram illustrating a hardware structure of the transmission terminal of the transmission system of FIG. 1.

The body 1100 has an operation panel 1150, which is provided at a front surface toward the right side wall 1130. The operation panel 1150 includes a plurality of operation buttons 108*a* to 108*e* ("the operation button 108"), a power switch 109, an alarm lamp 119, and a plurality of sound output holes 1151. Through the sound output holes 1151, the speaker 115 of the terminal 10 is able to output sounds such as sounds generated based on human voice. The body 1100 further includes a holder 1160, which is provided at the front surface toward a left side wall 1140. The holder 1160, which has a concave shape, accommodates therein the arm 1200 and the camera housing 1300. The right side wall 1130 is further provided with a plurality of connection ports 1132*a* to 1132*c*. The connection ports 1132 allow electrical connection to an external device through an outside device connection I/F 118 (FIG. 5). The body 1100 further includes the left side wall 1140, which is provided with a connection port to connect the external display 120 to a display I/F 117 through a cable 120*c*.

The arm 1200 is fixed to the body 1100 via a torque hinge 1210. With the torque hinge 1210, the arm 1200 can be rotated in directions of up and down with respect to the body 1100, while making a tilt angle θ1 of up to 135 degrees. FIG. 4 illustrates the case where the tilt angle θ1 is 90 degrees. The camera housing 1300 incorporates therein a camera 112 (FIG. 5) that takes an image of an object. The object may be a part of a user, document, or a room where the terminal 10 is located. The camera housing 1300 is provided with a torque hinge 1310. The camera housing 1300 is fixed to the arm 1200 through the torque hinge 1310. With the torque hinge 1300, the camera housing 1310 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to +180 degrees in the direction right and left, and a tilt angle θ3 that ranges from about −45 degrees to +45 degrees in the direction of up and down. In FIG. 4, the pan angle θ2 and the tilt angle θ3 are each 0 degree.

The relay terminal 30, the access object management system 40, the management system 50, the updating system 60, the screen provider system 80, the program providing system 90, and the maintenance system 100 are each implemented by a general-purpose computer such as a personal computer or a server computer. For simplicity, explanation of the outer appearance of the computer is omitted.

FIG. 5 is a schematic block diagram illustrating a hardware structure of the transmission terminal 10 of FIG. 1. As illustrated in FIG. 5, the terminal 10 includes a central processing unit (CPU) 101, a read only memory (ROM) 102, a random access memory (RAM) 103, a flash memory 104, a solid state drive (SSD) 105, a medium drive 107, the operation button 108, the power switch 109, a network interface (I/F) 111, the camera 112, an imaging element interface (I/F) 113, the microphone 114, the speaker 115, a voice input/output interface (I/O I/F) 116, a display interface (I/F) 117, the outside device connection interface (I/F) 118, and the alarm lamp 119, which are electrically connected through a bus 110 such as an address bus or data bus.

The CPU 101 controls entire operation of the terminal 10. The ROM 102 stores therein a control program for execution by the CPU 101, such as an initial program loader (IPL). The RAM 103 functions as a work area of the CPU 101. The flash memory 104 stores therein various data such as the terminal control program, image data, or voice data. The SSD 105 controls reading or writing of various data with respect to the flash memory 104 under control of the CPU 101. The medium drive 107 controls reading or writing of various data with respect to a removable recording medium 106 such as a flash memory. The operation button 108 allows the user to input a user instruction, for example, by allowing the user to select a communication destination such as the counterpart terminal 10B. The power switch 109 allows the user to switch on or off the power of the terminal 10. The network I/F 111 allows the terminal 10 to transmit data through the communication network 2.

The camera 112 takes an image of an object to obtain image data under control of the CPU 101. The imaging element I/F 113 controls operation of the camera 112. The microphone 114 catches sounds such as voice of the user at the terminal 10. The speaker 115 outputs sounds such as sounds generated based on voice of the user at the counterpart terminal 10B. The sound I/O I/F 116 controls input or output of sound signals such as voice signals with respect to the microphone 114 and the speaker 115 under control of the CPU 101. The display I/F 117 transmits image data to the display 120 under control of the CPU 101. The outside device connection I/F 118 controls connection of the terminal 10 to various types of outside device. The alarm lamp 119 generates notification when an error is detected such as in the terminal 10.

The display 120 may be implemented by a liquid crystal display (LCD) or an organic light emitting display, which displays various data such as an image of an object or an operation icon. As illustrated in FIGS. 4 and 5, the display 120 is connected to the display I/F 117 through the cable 120*c*. The cable 120*c* may be implemented by an analog RCB (VGA) signal cable, a component video cable, a high-definition multimedia interface (HDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The outside device connection I/F 118 may be connected to an outside device such as an external camera, external microphone, or external speaker through a universal serial bus (USB) cable that is connected through the port 1132 of the body 1100 (FIG. 4). When the external camera is connected to the terminal 10, the CPU 101 causes the terminal 10 to capture an image using the external camera, rather than the camera 112 that is incorporated in the terminal 10. When the external microphone or the external speaker is connected to the terminal 10, the CPU 101 causes the terminal 10 to use the external microphone or the external speaker in replace of the incorporated microphone 114 or the incorporated speaker 115. Alternatively, the user may select which device to be used.

The recording medium 106, which can be freely attached to or detached from the terminal 10, includes any desired type of recording medium. In alternative to the flash memory 104, any nonvolatile memory that is readable and writable under control of the CPU 101 may be used such as Electrically Erasable and Programmable ROM (EEPROM).

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 6:
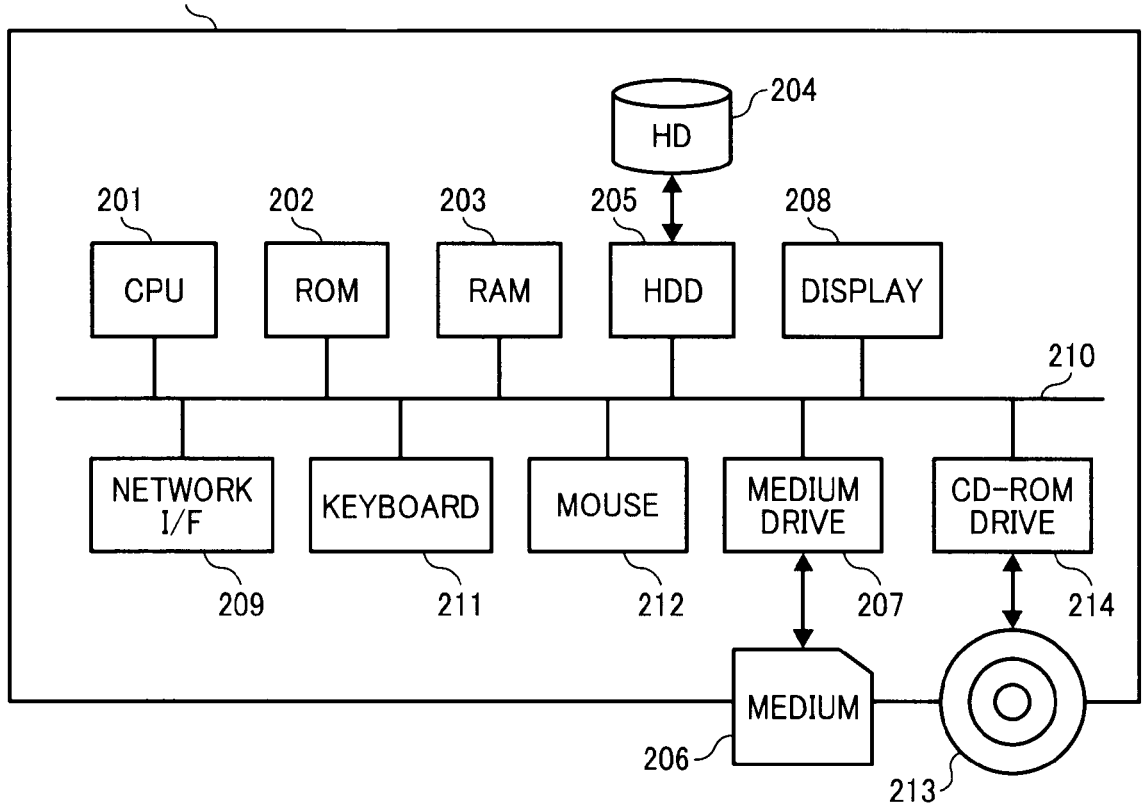
FIG. 6 is a schematic block diagram illustrating a hardware structure of any one of a relay terminal, access object management system, transmission management system, updating system, screen provider system, program providing system, and maintenance system of the transmission system of FIG. 1.

FIG. 6 illustrates a hardware structure of the management system 50 of FIG. 1. The management system 50 includes a CPU 201, a ROM 202, a RAM 203, the HD 204, a hard disk drive (HDD) 205, a medium drive 207, a display 208, a network interface (I/F) 209, a keyboard 211, a mouse 212, and a CD-ROM drive 214, which are electrically connected through a bus 210 such as an address bus or a data bus.

The CPU 201 controls entire operation of the management system 50. The ROM 202 stores a control program for execution by the CPU 201, such as an IPL. The RAM 203 functions as a work area of the CPU 201. The HD 204 stores therein various data such as the transmission management program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communication network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used.

The transmission management program may be written onto a recording medium that is readable by a general-purpose computer such as the recording medium 206 or the CD-ROM 213 in any format that is installable or executable by a general-purpose computer. Once the transmission management program is written onto the recording medium, the recording medium may be distributed. Further, the transmission management program may be stored in any desired memory other than the HD 204, such as the ROM 202.

The relay terminal 30 is substantially similar in hardware structure to the management system 50 of FIG. 6, except for replacement of the management program with a relay terminal control program that is used for controlling the relay terminal 30. The relay terminal control program may be written onto a recording medium that is readable by a general-purpose computer such as the recording medium 206 or the CD-ROM 213 in any format that is installable or executable by the general-purpose computer. Once the relay terminal control program is written onto the recording medium, the recording medium may be distributed. Further, the relay terminal control program may be stored in any desired memory other than the HD 204, such as the ROM 202.

The program providing system 90 is substantially similar in hardware structure to the management system 50 of FIG. 6, except for replacement of the management program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the HD 204, such as the ROM 202.

The access object management system 40 is substantially similar in hardware structure to the management system 50 of FIG. 6, except for replacement of the management program with an access object management program that is used for controlling the access object management system 40. The access object management program may be written onto a recording medium that is readable by a general-purpose computer such as the recording medium 206 or the CD-ROM 213 in any format that is installable or executable by the general-purpose computer. Once the access object management program is written onto the recording medium, the recording medium may be distributed. Further, the access object management program may be stored in any desired memory other than the HD 204, such as the ROM 202.

The updating system 60, the screen provider system 80, and the maintenance system 100 are each substantially similar in hardware structure to the management system 50 of FIG. 6, except for replacement of the management program with a control program that is used for controlling a corresponding one of the updating system 60, the screen provider system 80, and the maintenance system 100.

Other examples of removable recording medium, which may be used in replace of the CD-ROM 213, include, but not limited to, compact disc recordable (CD-R), digital versatile disk (DVD), and blue ray disc.

<Functional Structure of Transmission System>

Referring now to FIG. 7, a functional structure of the transmission system 1 of FIG. 1 is explained according to an example embodiment of the present invention. More specifically, FIG. 7 illustrates a functional structure of the terminal 10, the access object management system 40, and the management system 50. As illustrated in FIG. 7, the terminal 10, the access object management system 40, and the management system 50 exchange data with one another through the communication network 2. In FIG. 7, the updating system 60, the screen provider system 80, the program providing system 90, and the maintenance system 100 of FIG. 1 are omitted.

<Functional Structure of Terminal>

The terminal 10 includes a data transmit/receive 11, an operation input 12, a login request 13, an imaging unit 14, a sound input 15*a*, a sound output 15*b*, a display control 16, and a memory control 19. These units shown in FIG. 7 correspond to a plurality of functions or functional modules, which are executed according to an instruction of the CPU 101 (FIG. 5) that is generated according to the terminal control program being loaded from the flash memory 104 onto the RAM 103. The terminal 10 further includes a memory 1000 that may be implemented by the RAM 103 and the flash memory 104 of FIG. 5.

<Functional Structure of Terminal>

Next, a functional structure of the terminal 10 is explained according to an example embodiment of the present invention. More specifically, in this example, the operations or functions that are performed by the terminal 10, which include the operations or functions performed by the units shown in FIG. 7, are performed in relation to one or more hardware devices of the terminal 10 that are shown in FIG. 5.

The data transmit/receive 11, which may be implemented by the network I/F 111 (FIG. 5), transmits or receives various data or information to or from another terminal, device, or system, through the communication network 2, under control of instructions received from the CPU 101.

The operation input 12 receives a user instruction input by the user through the operation button 108 or the power switch 109 (FIG. 5), under control of the instructions received from the CPU 101. For example, when the user selects "ON" using the power switch 109, the operation input 12 receives a user instruction for turning the power on, and causes the terminal 10 to turn on the power.

The operations or functions of the login request 13 are performed according to an instruction received from the CPU 101. When the power of the terminal 10 is turned on, the login request 13 automatically causes the data transmit/receive 11 to send login request information that requests the login process to the management system 50 through the communication network 2. The login request information includes access authentication ID and access authentication password, which are used to determine whether access to the management system 50 is allowed.

When the power of the terminal 10 is turned off according to a user instruction received from the user through the power switch 109, the login request 13 causes the data transmit/receive 11 to send current state information of the terminal 10 to the management system 50, which indicates that the power of the terminal 10 is turned off. After the state information is sent, the operation input 12 turns off the power of the terminal 10. As the state information of the terminal 10 is sent every time the power is turned off, the management system 50 is able to know that the terminal 10 is off-line in realtime.

The operations or functions of the imaging unit 14 of the terminal 10 of FIG. 7 are performed by the camera 112 and the imaging element I/F 113 according to an instruction received from the CPU 101. The imaging unit 14 takes an image of an object to output image data of the object.

The operations or functions of the sound input 15a of the terminal 10 of FIG. 7 are performed by the sound I/O I/F 116 according to an instruction received from the CPU 101, in cooperation with the microphone 114. After the microphone 114 converts voice of the user at the terminal 10 to a voice signal, the sound input 15a inputs the voice signal in the form of voice data for further processing. The operations or functions of the sound output 15b of the terminal 10 of FIG. 7 are performed by the sound I/O I/F 116 according to an instruction received from the CPU 101, in cooperation with the speaker 115. The sound output 15b outputs a voice signal of voice data that is received from the counterpart terminal 10 through the speaker 115.

The display control 16 may be implemented by the display I/F 117 (FIG. 5) according to an instruction received from the CPU 101, and sends various data to the display 120 for display onto the display 120. For example, as illustrated in FIG. 2, the display control 16 combines image data of different resolutions to generate an image to be displayed onto the display 120. Further, the display control 16 transmits candidate list information received from the management system 50 to cause the display 120 to display a candidate list based on the candidate list information.

The memory control 19 is implemented by the SSD 105 of FIG. 5 according to an instruction received from the CPU 101. The memory control 19 stores various data in the memory 1000, or reads out various data from the memory 1000. The memory 1000 stores therein terminal certification data, such as a client certificate, which is used to certify the terminal 10. In response to a request from a server in the transmission system 1 such as the access object management system 40, the terminal 10 sends the terminal certificate data to be certified by the access object management system 40 before establishing a session. The memory 1000 overwrites its memory space to store image data and/or voice data every time the terminal 10 communicates with another terminal 10. Before overwriting image data with new image data, the memory control 19 reads out the image data for display on the display 120, and the voice data for output through the speaker 115.

In this example, any one of the terminal certificate data of the terminal 10, the relay terminal ID of the relay terminal 30, and the ID of the management system 50, includes any type of identification information that can be expressed by any language, character, symbol, mark, or any combination of language, character, symbol, and mark.

<Structure of Access Object Management System>

The access object management system 40 includes a data transmit/receive 41, an operation input 42, an extractor 43, a certificate manager 44, a determiner 45, a changer 46, and a memory control 49. These units shown in FIG. 7 correspond to a plurality of functions or functional modules, which are executed according to an instruction of the CPU 201 (FIG. 6) that is generated according to the access object management program being loaded from the HD 204 onto the RAM 203. The access object management system 40 further includes a memory 4000, which is implemented by the HD 204 (FIG. 6).

(Certificate Management Table)

The memory 4000 stores a certificate management DB 4001, which includes a certificate management table of FIG. 8. The certificate management table of FIG. 8 stores, for each one of a plurality of items of terminal certificate data of the terminals 10, access determination ID to be used for extracting data indicating whether access by the terminal 10 is restricted. The access determination ID is an example of access determination data.

(Access Restriction Management Table)

The memory 4000 further includes an access restriction management DB 4002, which stores an access restriction management table of FIG. 9. The access restriction management table of FIG. 9 stores, for each one of the plurality of access determination IDs stored in the certificate management table of FIG. 8, access restriction data indicating whether access by the corresponding terminal 10 is restricted. For example, when the user at the terminal 10 has paid a service fee by a certain date, the access restriction data is set to "NOT RESTRICTED" indicating that there is no restriction to access from the terminal 10. When the user at the terminal 10 has not paid a service fee by such date, the access restriction data is set to "RESTRICTED" indicating that there is restriction to access by the terminal 10. As described below, the access restriction data may be manually input by a service provider of the transmission system 1. Alternatively, the access object management system 40 may automatically input the access restriction data as long as information regarding payment of the user is obtained. Such information regarding payment may be managed by a fee management system that may be provided in the transmission system 1.

The access restriction management table of FIG. 9 further stores, for each one of the plurality of access determination IDs, an access authentication ID and an access authentication password that are together used to determine whether to allow access from the terminal 10. In this example, an object that is allowed for the terminal 10 to access under a certain condition, for example, when a service fee is paid, includes the management system 50.

(Access Object Management Table)

The memory 4000 further stores an access object management DB 4003, which includes an access object management table of FIG. 10. The access object management table of FIG. 10 stores, for each one of the plurality of items of access restriction data stored in the access restriction management table of FIG. 9, a uniform resource identifier (URI) of an object that is allowed for access by the terminal 10. More specifically, the URI of the object that can be accessed by the terminal 10 differs, depending on whether there is restriction to access by the terminal 10 as specified by the access restriction data. In this example, when there is no restriction to access by the terminal 10, the terminal 10 is allowed to access the management system 50, the updating system 60, and the screen provider system 80. Referring to FIG. 10, the URIs of the management system 50, the updating system 60, and the screen provider system 80 are respectively stored in association with the access restriction data "NOT RESTRICTED". When there is restriction to access by the terminal 10, the terminal 10 is only allowed to access the updating system 60 and the screen provider system 80. Referring to FIG. 10, the URIs of the updating system 60 and the screen provider system 80 are respectively stored in association with the access restriction data "RESTRICTED". In this example, the URI includes a uniform resource locator (URL) and a uniform resource name (URN). Further, in this example, the certificate management table of FIG. 8 and the access object management table of FIG. 10 may be combined into one table as their contents can be linked together via the access restriction data. Alternatively, any one of data or information which are stored in these tables stored in the memory 4000 may be managed in various other ways. For example, any data or information stored in the memory 4000 may be stored in location other than the memory 4000 as long as the access object management system 40 can have access to data or information.

(Functional Structure of Access Object Management System)

Referring to FIG. 7, a functional structure of the access object management system 40 is explained according to an example embodiment of the present invention. More specifically, in this example, the operations or functions that are performed by the access object management system 40, which include the operations or functions performed by the units shown in FIG. 7, are performed in relation to one or more hardware devices of the access object management system 40 that are shown in FIG. 6.

The data transmit/receive 41, which may be implemented by the network I/F 209 (FIG. 6) under control of the CPU 201, transmits or receives various data or information to or from another terminal, device, or system, through the communication network 2.

The operation input 42 receives a user instruction input by the user through the keyboard 211 or the mouse 212 (FIG. 6) under control of the instructions received from the CPU 201.

The extractor 43 operates according to instructions received from the CPU 201, which are generated according to the access object management program loaded onto the RAM 203. When the extractor 43 receives access object request information including the terminal certificate data ("the request") from the terminal 10, the extractor 43 searches the certificate management table (FIG. 8) stored in the certificate management DB 4001 using the terminal certificate data of the terminal 10 as a key to obtain access determination ID of the terminal 10 that has sent the request. Further, the extractor 43 searches the access restriction management table (FIG. 9) stored in the access restriction management DB 4002 using the access determination ID of the terminal 10, which is extracted, to obtain access restriction data that corresponds to the extracted access determination ID. Further, the extractor 43 searches the access restriction management able (FIG. 9) of the access restriction management DB 4002 using the access determination ID of the terminal 10 to obtain access authentication ID and access authentication password of the terminal 10. Further, the extractor 43 searches the access object management table (FIG. 10) stored in the access object management DB 4003 using the extracted access restriction data to obtain a URI of the object that can be accessed by the terminal 10.

The certificate manager 44 operates according to instructions received from the CPU 201 (FIG. 6), which are generated according to the access object management program loaded onto the RAM 203. When the extractor 43 extracts the access determination ID of the terminal 10 that has sent the request, the certificate manager 44 determines that the terminal 10 that has sent the request including the terminal certificate data is an authenticated terminal in the transmission system 1. When the extractor 43 does not extract the access determination ID of the terminal 10 that has sent the request, the certificate manager 44 determine that the terminal 10 that has sent the request including the terminal certificate data is not an authenticated terminal in the transmission system 1.

The determiner 45, which operates according to instructions received from the CPU 201 that are generated according to the access object management program, determines whether there is restriction to access by the terminal 10 that has requested for an object that can be accessed, using the access restriction data extracted by the extractor 43 for the terminal 10 that has sent the request. More specifically, when the access restriction data is "NOT RESTRICTED", the determiner 45 determines that there is no restriction to access by the terminal 10. When the access restriction data is "RESTRICTED", the determiner 45 determines that there is restriction to access by the terminal 10.

The changer 46 changes the access restriction data, which is managed using the access restriction management table (FIG. 9) of the access restriction management DB 4002, according to instructions of the CPU 201 (FIG. 6) that are generated according to the access object management program. As described below, the access restriction data may be manually entered or updated by staff of a service provider of the transmission system 1, based on information regarding payment of the user. In such case, the operation input 42 receives user instructions regarding the change to the access restriction data, and sends such instructions to the changer 46.

Alternatively, the access object management system 40 may automatically enter or update the access restriction data as long as information regarding payment by the user is obtained. Such information regarding payment may be managed by the service provider using a fee management system. For example, the fee management system may periodically send updated information regarding payment by the user to the access object management system 40. Referring to the updated information, the changer 46 changes the access restriction data of FIG. 9 from "NOT RESTRICTED" to "RESTRICTED" when a specific condition is met. Examples of the specific condition include, but not limited to, any time when it is determined that the user at the terminal 10 has not paid a service fee for a certain time period, when the user at the terminal 10 requests the service provider of the transmission system to stop the paid services, and when an agreement related to the paid services such as videoconference services is terminated or expired. For example, when the user at the terminal 10 recognizes that the terminal 10 is being lost or stolen, the user at the terminal 10 may request the service provider to stop the paid services. The changer 46 changes the access restriction data of FIG. 9 from "RESTRICTED" to "NOT RESTRICTED" when the above-described specific condition is not met. For example, when the user at the terminal 10 has paid the service fee, when providing of the paid services is restarted, or when the agreement is renewed, the changer 46 changes the access restriction data to "NOT RESTRICTED". The service provider may previously set criteria for determining whether the specific condition is met, and store such information in a manner that can be referred to by the changer 46.

The memory control 49 operates according to instructions received from the CPU 201 in cooperation with the HDD 205, the medium drive 207, or the CD-ROM drive 214 (FIG. 6). The memory control 49 writes or reads various data with respect to the memory 1000.

<Functional Structure of Management System>

The management system 50 includes a data transmit/receive 51, an extractor 52, a terminal authenticator 53, and a memory control 59. These units shown in FIG. 7 correspond to a plurality of functions or functional modules, which are executed according to an instruction of the CPU 201 (FIG. 6) that is generated according to the transmission management program being loaded from the HD 204 onto the RAM 203. The management system 50 further includes a memory 5000, which may be implemented by the HD 204 of FIG. 6.

(Access Authentication Management Table)

The memory 5000 includes an access authentication management database (DB) 5001, which stores an access authentication management table of FIG. 11. The access authentication management table of FIG. 11 stores an access authentication ID and an access authentication password. Using the access authentication ID and the access authentication password, the management system 50 determines whether the terminal 10 that has requested to login is an authenticated terminal. In this example, it is assumed that the access authentication ID and the access authentication password are provided for each one of the plurality of terminals 10 that are registered to the transmission system 1.

(Functional Structure of Management System)

Referring now to FIG. 7, a functional structure of the management system 50 is explained.

The data transmit/receive 51, which may be implemented by the network I/F 209 (FIG. 6) according to an instruction received from the CPU 201, transmits or receives various data or information to or from another terminal, device, or system through the communication network 2.

Under control of the CPU 201 (FIG. 6), the extractor 52 obtains an access authentication ID and an access authentication password from the login request information that is received from the data transmit/receive 51. Using the access authentication ID and the access authentication password as a search key, the extractor 52 searches the access authentication management table (FIG. 11) stored in the access authentication management DB 5001 to determine whether the obtained set of access authentication ID and password is registered, and extracts the set of authentication ID and password that match the search key if registered.

The access authenticator 53, which operates according to instructions from the CPU 201 (FIG. 6), determines whether the terminal 10 that sends the login request information is an authenticated terminal that is allowed to access the management system 50. More specifically, when the extractor 52 extracts the access authentication ID and the access authentication password, which are the same with the search key, the access authenticator 53 determines that the terminal 10 that has sent the login request information is an authenticated terminal that is allowed to access the management system 50 to use a specific service of the transmission system 1 such as videoconference services. When the extractor 52 does not extract the access authentication ID and the access authentication password, which are the same with the search key, the access authenticator 53 determines that the terminal 10 that has sent the login request information is not an authenticated terminal that is allowed to use a specific service of the transmission system 1 such as videoconference services.

The memory control 59 operates according to instructions received from the CPU 201 (FIG. 6) in cooperation with the HDD 205, the medium drive 207, or the CD-ROM drive 214 (FIG. 6). The memory control 59 writes or reads various data with respect to the memory 1000.

<Operation of Transmission System>

Figure 13:
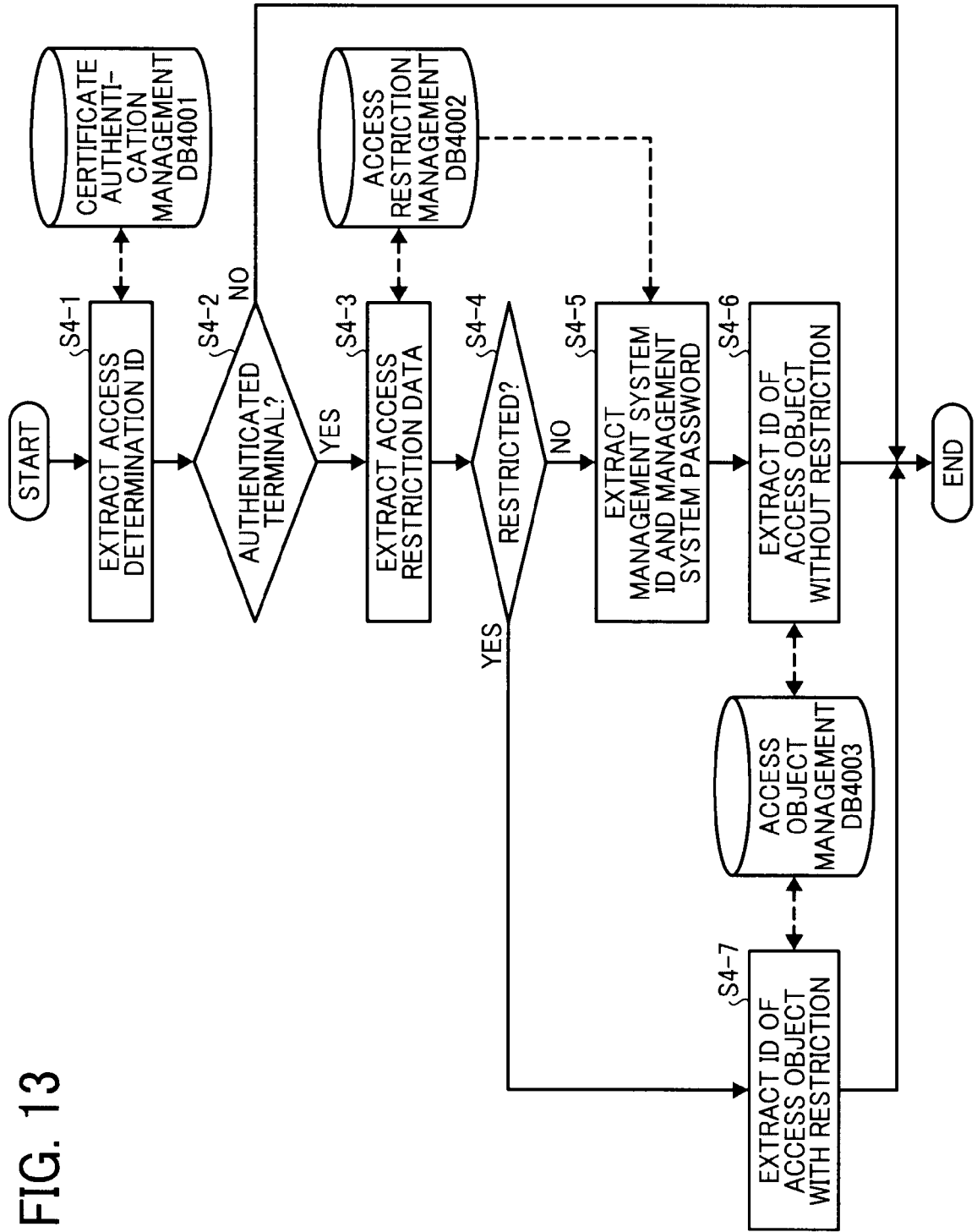
FIG. 13 is a flowchart illustrating operation of extracting an object that is allowed for access by the transmission terminal of FIG. 1, performed by the access object management system of FIG. 1.

Referring now to FIGS. 12 and 13, example operation of the transmission system 1 of FIG. 1 is explained. FIG. 12 is a data sequence diagram illustrating operation of managing an object that is allowed for access by the terminal 10aa and allowing the terminal 10aa to access the transmission management system 50, performed by the transmission system 1. FIG. 13 is a flowchart illustrating operation of extracting one or more objects that are allowed for access by the terminal 10aa, performed by the access object management system 40.

Referring to FIG. 12, at S1, the user at the request terminal 10aa turns on the power of the request terminal 10aa through the power switch 109 (FIG. 5). The operation input 12 (FIG. 7) of the request terminal 10aa turns on the power of the request terminal 10aa.

At S2, the data transmit/receive 11 of the terminal 10aa establishes a Secure Socket Layer (SSL) session with the access object management system 40. To establish the SSL session, the data transmit/receive 11 sends, to the access object management system 40, the terminal certificate data read out from the memory 1000 of the terminal 10aa through the memory control 19. When the terminal 10aa is authenticated using the terminal certificate data by the access object management system 40, the SSL session is established. When the terminal 10aa is not authenticated, the SSL session is not established such that the operation ends in error. In this example, it is assumed that the certificate manager 44 certifies the terminal certificate data of the terminal 10aa. Further, when the terminal certificate data of the terminal 10aa is received at the time of establishing the SSL session, the memory control 49 may store the terminal certificate data in the certificate management table of FIG. 8, if the terminal certificate data is not stored. Further, at the time of storing the terminal certificate data of the terminal 10aa, the access object management system 40 may assign the access determination ID to the newly stored terminal certificate data.

Assuming that the terminal 10aa has established the SSL session, at S3, the data transmit/receive 11 of the terminal 10aa sends access object request information to the access object management system 40 through the communication network 2 to request for information regarding an object that can be accessed by the terminal 10aa. The access object request information includes the terminal certificate data, which is used for establishing the SSL session at S2. The access object management system 40 receives the terminal certificate data of the terminal 10aa at the data transmit/receive 41.

At S4, the access object management system 40 extracts information regarding an object that can by accessed by the terminal 10aa. Referring now to FIG. 13, operation of extracting an object that is allowed for access by the terminal 10aa is explained according to an example embodiment of the present invention.

At S4-1, the extractor 43 of the access object management system 40 searches the certificate management table of FIG. 8 stored in the certificate management DB, using the terminal certificate data "11aa" received at S3 to extract the access determination ID "00aa" that corresponds to the terminal certificate data "11aa". When the access determination ID "00aa" is extracted at S4-1, the certificate manager 44 determines that the terminal 10aa that transmits the terminal certificate data "11aa" is a terminal that is allowed for access ("YES" at S4-2). When the access determination ID "00aa" is not extracted at S4-1, the certificate manager 44 determines that the terminal 10aa that transmits the terminal certificate data "11aa" is not allowed for access ("NO" at S4-2).

When it is determined that the terminal 10aa is not an authenticated terminal ("NO" at S4-2), the operation ends in error. When it is determined that the terminal 10aa is an authenticated terminal ("YES" at S4-2), at S4-3, the extractor 43 searches the access restriction management table (FIG. 9) stored in the access restriction management DB 4002 using the access determination ID "00aa" of the terminal 10aa to extract access restriction data that corresponds to the extracted access determination ID "00aa".

At S4-4, the determiner 45 determines whether the access restriction data indicates that access by the terminal 10aa is restricted. When it is determined that access is not restricted ("NO" at S4-4), the operation proceeds to S4-5. At S4-5, the extractor 43 searches the access restriction management table (FIG. 9) stored in the access restriction management DB 4002 using the access determination ID "00aa" to extract the access authentication ID "udc001" and the access authentication password "udcpass001" that are stored in association with the access determination ID "00aa".

At S4-6, the extractor 43 searches the access object management table (FIG. 10) stored in the access object management DB 4003 using the access restriction data "NOT RESTRICTED" to extract the URI of the object that can be accessed by the terminal 10aa. In this example, the URI of the management system 50, the URI of the updating system 60, and the URI of the screen provider system 80 are respectively extracted, and the operation ends. Information regarding the extracted URIs are sent to the data transmit/receive 41.

When it is determined that access by the terminal 10aa is restricted ("YES" at S4-4), the operation proceeds to S4-7. In such case, the access restriction data for the access determination ID "00aa" of the terminal 10 indicates "NOT RESTRICTED". At S4-7, the extractor 43 searches the access object management table (FIG. 10) stored in the access management object DB 4003 (FIG. 10) using the access restriction data "RESTRICTED" to extract the URI of the object that can be accessed by the terminal 10aa. In this example, the URI of the updating system 60, and the URI of the screen provider system 80 are respectively extracted, and the operation ends. Information regarding the extracted URIs are sent to the data transmit/receive 41.

Referring back to FIG. 12, at S5, the data transmit/receive 41 of the access object management system 40 transmits access object information regarding the object that is allowed for access by the terminal 10aa through the communication network 2. The access object information is generated based on information regarding the extracted URIs and/or the extracted ID and password, which are obtained by the extractor 52 at S4. More specifically, when the access restriction data of the terminal 10aa is "NOT RESTRICTED", the access object information includes the URI of the management system 50, the URI of the updating system 60, and the URI of the screen provider system 80, which are respectively obtained at S4-6, as well as the access authentication ID "udc001" and the access authentication password "udcpass001" that are used for the terminal 10aa to access the object that is allowed for access only when the access is not restricted. In this example, the object that is allowed for access only when the access is not restricted includes the management system 50. When the access restriction data of the terminal 10aa is "RESTRICTED", the access object information includes the URI of the updating system 60 and the URI of the screen provider system 80, which are respectively obtained at S4-6. Since access to the management system 50 is not allowed, the operation ends without accessing the management system 50.

When access to the management system 50 is allowed, that is, when the access restriction data is "NOT RESTRICTED", the terminal 10aa accesses the management system 50 to request for login process. At S6, the data transmit/receive 11 of the terminal 10aa establishes a session with the management system 50.

At S7, the login request 13 of the terminal 10aa causes the data transmit/receive 11 to send login request information to the management system 50 through the communication network 2. The data transmit/receive 51 of the management system 50 receives the login request information. The login request information includes the access authentication ID "udc001" and the access authentication password "udcpass001", which are respectively received at S5.

At S8, the access authenticator 53 of the management system 50 determines whether the terminal 10aa that transmits the login request information is allowed to access the management system 50. More specifically, the access authenticator 53 searches the access authentication management table (FIG. 11) stored in the access authentication management DB 5001 to determine whether the access authentication ID and the access authentication password of the login request information match with the ID and the password stored in the table.

At S9, the data transmit/receive 50 of the management system 50 transmits login authentication result information indicating the authentication result obtained at S8 to the terminal 10aa through the communication network 2. Assuming that the authentication result indicates that authentication is successful, the terminal 10aa is able to log in the transmission system 1 through the management system 50 to use specific services such as videoconference services.

The above-described operation of FIG. 12 or 13 may be performed in various other ways. For example, at S4-4 of FIG. 13, the determiner 45 determines whether the access restriction data indicates that access by the terminal 10aa is not restricted.

As described above, in this example, the transmission system 1 of FIG. 1 specifies an object that is allowed for access by the terminal 10 even when access by the terminal 10 is restricted. In this manner, even when access by the terminal 10 should be restricted for a specific part of the transmission system 1, the transmission system 1 still allows the terminal 10 to access a part of the transmission system 1, other than the specific part that should be restricted. This improves operability for the user as the user is allowed to use services that should be provided by the service provider under any condition.

Further, as described above, the terminal 10 sends the terminal certificate data to the access object management system 40 for verification to establish a secure session with the access object management system 40. Once verified, the terminal 10 sends a request for information regarding an object that is allowed for access by the terminal 10, which includes the terminal certificate data, to the access object management system 40. The access object management system 40 determines whether the terminal 10 is an authenticated terminal based on whether the access determination ID, which corresponds to the terminal certificate data of the terminal 10, is extracted. Since authentication is performed in multiple steps, security of the transmission system 1 increases.

Further, as described above, the access determination ID is stored in a manner such that it corresponds to the access restriction data indicating whether access by the terminal 10 is restricted. With this function of the access determination ID that associates the terminal certificate data that is used for certificate verification with the access restriction data that indicates whether there is restriction to the terminal 10, the access restriction data regarding the specific terminal 10 can be managed or associated with the specific terminal 10 even when the terminal 10 is certified based on the terminal certificate data. In this manner, the terminal 10 does not have to send the terminal ID or the password of the terminal 10 to the access object management system 40.

Further, as described above, the access object management system 40 obtains the access authentication ID and the access authentication password of the object that is allowed for access by the terminal 10 only when access by the terminal 10 is not restricted, and sends such information to the terminal 10 to cause the terminal 10 to log into such object. With this function, the access authentication ID and the access authentication password are only sent to the certified terminal 10, thus improving security in the transmission system 1.

The relay terminal 30, the access object management system 40, the management system 50, the updating system 60, the screen provider system 80, the program providing system 90, and the maintenance system 100 may be each implemented by a single computer such as a server. Alternatively, any number of parts, functions, or modules of the relay terminal 30, the access object management system 40, the management system 50, the updating system 60, the screen provider system 80, the program providing system 90, and the maintenance system 100 may be classified into a desired number of groups to be carried out by a plurality of computers such as a plurality of servers. For the descriptive purposes, any one of the relay terminal 30, the access object management system 40, the management system 50, the updating system 60, the screen provider system 80, the program providing system 90, and the maintenance system 100, each of which may be implemented by any desired number of computers or servers, may be referred to as a server or a subsystem.

In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

The control programs, which are respectively installed onto the terminal 10, the relay terminal 30, the access object management system 40, the transmission management system 50, the updating system 60, and the screen provider system 80, may be stored into any desired recording medium such as CD-ROM, flash memory, or HD. The recording medium may be distributed within the country or to another country as a computer program product.

In the above-described examples, the transmission system 1 of FIG. 1 is implemented as a videoconference system. Alternatively, the transmission system 1 of FIG. 1 may be implemented as a teleconference system such as the Internet Protocol (IP) teleconference system or the Internet teleconference system. Alternatively, the transmission system 1 of FIG. 1 may be implemented as a car navigation system. For example, the request terminal 10A may be implemented as a car navigation system that is installed onto an automobile.

The counterpart terminal 10B may be implemented as a management terminal or server at a management center that manages the car navigation system or a car navigation system that is installed onto another automobile.

In another example, the transmission system 1 may be implemented by a communication system having a portable phone. In such case, the portable phone functions as the terminal 10.

In the above-described examples, the contents data is assumed to include image data and voice data. Alternatively, the contents data may include any other type of data that affects human senses of sight, smell, taste, touch, and hearing. In case of the contents data that affects human senses of touch, the terminal 10 may convey the contents data that reflects senses of touch that is felt by a user at the terminal 10 to another terminal 10 through the communication network 2. In case of the contents data that affects human senses of smell, the terminal 10 may convey the contents data that affects senses of smell felt by a user at the terminal 10 to another terminal 10 through the communication network 2. Further, the contents data may only include one type of contents data selected from sight data such as image data, hearing data such as voice data, touch data, smell data, and taste data.

Further, in the above-described examples, the transmissions system 1 is implemented as a videoconference system for use at offices. Other examples of use of the transmission system 1 include, but not limited to, meetings, casual conversation among family members or friends, and distribution of information in one direction.

In one example, the present invention may reside in an access object management system that manages an object that is allowed for access by a terminal. The access object management system includes: access restriction management means for managing access restriction data indicating whether access by the terminal is restricted in association with access determination identification data being used for authenticating the terminal; access object managing means for managing an URI of an object that is allowed for access by the terminal in association with the access restriction data; extracting means for searching the access restriction management means using the access determination identification data of the terminal to extract the access restriction data of the terminal and searching the access object managing means using the access restriction data being extracted to extract an URI corresponding to the access restriction data when a request that requests for an object that is allowed for access is received from the terminal; and transmitting means for transmitting information regarding the URI to the terminal that sends the request.

For example, the access restriction management means may be implemented by the access restriction management table, stored in a desired memory of the access object management system. The access object management means may be implemented by the access object management table, stored in a desired memory of the access object management system. The extracting means may be implemented by the extractor of the access object management system, which operates according to the instructions of the processor of the access object management system. The transmitting means may be implemented by the data transmit/receive of the access object management system, such as the network interface of the access object management system.

The access object management system further includes: determining means for determining whether access by the terminal is restricted based on the access restriction data extracted by the extracting means. The access restriction management means further manages an access authentication identification and an access authentication password that are used by the object that is allowed for access by the terminal to determine whether to allow access by the terminal. When the determining means determines that access by the terminal is not restricted, the extracting means extracts the access authentication identification and the access authentication password to the terminal.

The access object management system further includes changing means for changing the access restriction data managed by the access restriction managing means. For example, the changing means may be implemented by the changer of the access object management system, which operates according to the instructions of the processor of the access object management system.

In another example, the present invention may reside in a computer program that causes the access object management system to perform the above-described functions.

In another example, a program provider system is provided, which provides a control program that causes the access object management system to perform the above-described functions, through the communication network.

In another example, a maintenance system is provided, which maintains the access object management system.

As described above, the transmission system 1 manages an object that is allowed for access by the terminal 10 based on whether access by the terminal 10 is restricted. More specifically, the transmission system 1 allows the terminal 10 to access a part of the transmission system 1, rather than prohibiting the terminal 10 from accessing the entire transmission system 1, even when access by the terminal 10 is restricted. This improves operability for the user as the user is allowed to use the services that should be provided by the service provider under any condition.

In another example, the present invention may reside in: a transmission terminal including: a memory to store terminal certificate data of the terminal; a network interface to send object request information that requests information regarding an object that is allowed for access by the terminal to an access object management system and receive access object information from the access object management system. The object request information includes the terminal certificate data stored in the memory and causes the access object management system to extract access determination identification data that corresponds to the terminal certificate data, to extract access restriction data that corresponds to the extracted access determination identification data, and to send the access object information based on the access restriction data to the terminal. The terminal further includes a processor that causes the network interface to connect to a first object in the transmission system that is allowed for access by the terminal when access by the terminal is restricted using identification information of the first object included in the access object information, when the access restriction data indicates that access by the terminal is restricted. The processor further causes the network interface to connect to a second object in the transmission system that is allowed for access by the terminal when access by the terminal is not restricted using identification information of the second object included in the access object information, when the access restriction data indicates that access by the terminal is not restricted.

In another example, the present invention may reside in a non-transitory recording medium storing a plurality of instructions which cause, when executed, a processor to perform a method of managing an object in a transmission system that is allowed for access by a terminal. The method includes: receiving object request information from the terminal, the object request information including terminal certificate data of the terminal; extracting access determination identification data that corresponds to the terminal certificate data obtained from the object request information from a memory; extracting access restriction data that corresponds to the extracted access determination identification data from the memory; and sending access object information based on the access restriction data to the terminal. When the access restriction data indicates that access by the terminal is restricted, the extracting extracts identification information of a first object in the transmission system that is allowed for access by the terminal when access by the terminal is restricted, and the sending sends the identification information of the first set of objects as the access object information to the terminal. When the access restriction data indicates that access by the terminal is not restricted, the extracting extracts identification information of a second object in the transmission system that is allowed for access by the terminal when access by the terminal is not restricted, and the sending sends the identification information of the second object as the access object information to the terminal, the second object including at least one object that is allowed for access by the terminal only when access by the terminal is not restricted in addition to the first object.

In one example, the present invention may reside in: an access object management apparatus, including: a network interface to receive object request information from a terminal, the object request information including terminal certificate data of the terminal; a processor to extract access determination identification data that corresponds to the terminal certificate data obtained from the object request information, to extract access restriction data that corresponds to the extracted access determination identification data, and to cause the network interface to send access object information based on the access restriction data to the terminal, wherein when the access restriction data indicates that access by the terminal is restricted, the processor extracts identification information of a first object in the transmission system that is allowed for access by the terminal when access by the terminal is restricted, and causes the network interface to send the identification information of the first object as the access object information to the terminal, and when the access restriction data indicates that access by the terminal is not restricted, the processor extracts identification information of a second object in the transmission system that is allowed for access by the terminal when access by the terminal is not restricted, and causes the network interface to send the identification information of the second object as the access object information to the terminal, the second object including at least one object that is allowed for access by the terminal only when access by the terminal is not restricted in addition to the first object.

In another example, the access object management apparatus further includes: a memory to store the access determination identification data that associates the terminal certificate data and the access restriction data, and the access restriction data, wherein the processor determines that the terminal is authenticated when the access determination identification data that corresponds to the terminal certificate data obtained from the object request information is extracted from the memory.

In another example, in the access object management apparatus, the processor further obtains an identification and a password each corresponding to the extracted access determination identification data when the access restriction data indicates that access by the terminal is not restricted, and causes the network interface to send the identification and the password in addition to the identification information of the second object, as the access object information, to the terminal.

In another example, in the access object management apparatus, the memory further stores: the access restriction data indicating that access by the terminal is restricted, and the identification information of the first object, in association with each other; and the access restriction data indicating that access by the terminal is not restricted, and the identification information of the second object, in association with each other.

In another example, in the access object management apparatus, the memory further stores: the identification and the password in association with the access determination identification data of the terminal.

What is claimed is:

1. A transmission system, comprising:
    a terminal, including:
        a first network interface to send object request information that requests information regarding an object that is allowed for access by the terminal, the object request information including terminal certificate data of the terminal; and
    an access object management server connected to the terminal through a network, the server being one or more servers and including:
        a second network interface to receive the object request information from the terminal;
        a processor to extract access determination identification data that corresponds to the terminal certificate data obtained from the object request information, to extract access restriction data that corresponds to the extracted access determination identification data, and to cause the second network interface to send access object information based on the access restriction data to the terminal, wherein
        when the access restriction data indicates that access by the terminal is restricted, the processor extracts identification information of a first object in the transmission system that is allowed for access by the terminal when access by the terminal is restricted, the first object including at least a first server, and causes the second network interface to send the identification information of the first object as the access object information to the terminal, and
        when the access restriction data indicates that access by the terminal is not restricted, the processor extracts identification information of a second object in the transmission system that is allowed for access by the terminal when access by the terminal is not restricted, the second object including at least a second server, and causes the second network interface to send the identification information of the second object as the access object information to the terminal, the second object including at least one object that is allowed for access by the terminal only when access by the terminal is not restricted in addition to the first object, the at least one object in the second object includes at least a third server that includes a transmission management server to allow the terminal to transmit contents data to at least one other terminal in the transmission system through the network, and the first server does not include the third server.

2. The transmission system of claim 1, wherein the access object management server further includes:
    a memory to store the access determination identification data that associates the terminal certificate data with the access restriction data, and the access restriction data, wherein
    the processor determines that the terminal is authenticated when the access determination identification data that corresponds to the terminal certificate data obtained from the object request information is extracted from the memory.

3. The transmission system of claim 2, wherein:
    the processor of the access object management server further obtains an identification and a password each corresponding to the extracted access determination identification data when the access restriction data indicates that access by the terminal is not restricted, and causes the second network interface to send the identification and the password in addition to the identification information of the second object, as the access object information, to the terminal, and
    the first network interface of the terminal sends login request information to the at least one object that is allowed for access by the terminal only when access by the terminal is not restricted, the login request information including the identification and the password that are received from the access object management server.

4. The transmission system of claim 3, wherein the memory of the access object management server further stores:
    the access restriction data indicating that access by the terminal is restricted, and the identification information of the first object, in association with each other; and
    the access restriction data indicating that access by the terminal is not restricted, and the identification information of the second object, in association with each other.

5. The transmission system of claim 4, wherein the memory of the access object management server further stores:
    the identification and the password in association with the access determination identification data of the terminal.

6. The transmission system of claim 3, wherein the processor of the access object management server further enters or updates a status of the access restriction data indicating whether access by the terminal is restricted based on information regarding services provided through the terminal.

7. The transmission system of claim 6, wherein:
    the first object includes:
        an updating server to provide the terminal with an update controlling program; and
        a screen providing server to provide image data to be displayed through the terminal.

8. The transmission system of claim 1, wherein:
    the first and second servers are a same server or distinct servers.

9. The transmission system of claim 1, wherein:
    the second server includes an updating server, a screen provider server, and a management server.

10. The transmission system of claim 1, wherein:
    the second and third servers are a same server or distinct servers.

11. An access object management system to manage an object in a transmission system that is allowed for access by a terminal, the system comprising:
    means for receiving object request information from the terminal, the object request information including terminal certificate data of the terminal;

means for extracting access determination identification data that corresponds to the terminal certificate data obtained from the object request information;
means for extracting access restriction data that corresponds to the extracted access determination identification data; and
means for sending access object information based on the access restriction data to the terminal, wherein
when the access restriction data indicates that access by the terminal is restricted, the means for extracting extracts identification information of a first object in the transmission system that is allowed for access by the terminal when access by the terminal is restricted, the first object including at least a first server, and the means for sending sends the identification information of the first object as the access object information to the terminal, and
when the access restriction data indicates that access by the terminal is not restricted, the means for extracting extracts identification information of a second object in the transmission system that is allowed for access by the terminal when access by the terminal is not restricted, the second object including at least a second server, and the means for sending sends the identification information of the second object as the access object information to the terminal, the second object including at least one object that is allowed for access by the terminal only when access by the terminal is not restricted in addition to the first object, the at least one object in the second object including at least a third server that includes a transmission management server to allow the terminal to transmit contents data to at least one other terminal in the transmission system through a network, and the first server does not include the third server.

12. The access object management system of claim 11, further comprising:
means for storing the access determination identification data that associates the terminal certificate data with the access restriction data, and the access restriction data; and
means for determining that the terminal is authenticated when the access determination identification data that corresponds to the terminal certificate data obtained from the object request information is extracted from the means for storing.

13. The access object management system of claim 12, further comprising:
means for obtaining an identification and a password each corresponding to the extracted access determination identification data when the access restriction data indicates that access by the terminal is not restricted, wherein
the means for sending sends the identification and the password in addition to the identification information of the second object, as the access object information, to the terminal.

14. The access object management system of claim 13, further comprising:
means for storing the access restriction data indicating that access by the terminal is restricted, and the identification information of the first object, in association with each other; and
means for storing the access restriction data indicating that access by the terminal is not restricted, and the identification information of the second object, in association with each other.

15. The access object management apparatus of claim 14, further comprising:
means for storing the identification and the password in association with the access determination identification data of the terminal.

16. The access object management system of claim 11, wherein:
the first and second servers are a same server or distinct servers.

17. A method of managing an object in a transmission system that is allowed for access by a terminal, the method comprising:
receiving object request information from the terminal, the object request information including terminal certificate data of the terminal;
extracting access determination identification data that corresponds to the terminal certificate data obtained from the object request information from a memory;
extracting access restriction data that corresponds to the extracted access determination identification data from the memory; and
sending access object information based on the access restriction data to the terminal, wherein
when the access restriction data indicates that access by the terminal is restricted, the extracting extracts identification information of a first object in the transmission system that is allowed for access by the terminal when access by the terminal is restricted, the first object including at least a first server, and the sending sends the identification information of the first set of objects as the access object information to the terminal, and
when the access restriction data indicates that access by the terminal is not restricted, the extracting extracts identification information of a second object in the transmission system that is allowed for access by the terminal when access by the terminal is not restricted, the second object including at least a second server, and the sending sends the identification information of the second object as the access object information to the terminal, the second object including at least one object that is allowed for access by the terminal only when access by the terminal is not restricted in addition to the first object, the at least one object in the second object including at least a third server that includes a transmission management server to allow the terminal to transmit contents data to at least one other terminal in the transmission system through a network, and the first server does not include the third server.

18. The method of claim 17, further comprising:
storing the access determination identification data that associates the terminal certificate data with the access restriction data, and the access restriction data in the memory; and
determining whether the terminal is authenticated when the access determination identification data that corresponds to the terminal certificate data obtained from the object request information is extracted from the memory.

19. The method of claim 18, further comprising:
obtaining an identification and a password each corresponding to the extracted access determination identification data from the memory when the access restriction data indicates that access by the terminal is not restricted; and sending the identification and the password in addition to the identification information of the second object as the access object information to the terminal.

20. The method of claim 17, wherein:
the first and second servers are a same server or distinct servers.

* * * * *